(12) United States Patent
Moser

(10) Patent No.: US 6,206,492 B1
(45) Date of Patent: Mar. 27, 2001

(54) MID-ROLLER FOR ENDLESS TRACK LAYING WORK MACHINE

(75) Inventor: Todd E. Moser, Roanoke, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/357,620

(22) Filed: Jul. 20, 1999

(51) Int. Cl.$^7$ .......................... B62D 55/12; B62D 55/00; F16H 55/48
(52) U.S. Cl. ........................ 305/194; 305/137; 180/9.5
(58) Field of Search .................................. 305/136, 137, 305/138, 194 I, 195, 124, 116, 121, 128, 130, 60, 193; 295/9.1, 32; 180/9.5

(56) References Cited

U.S. PATENT DOCUMENTS

| | | |
|---|---|---|
| Re. 34,909 | 4/1995 | Kindel et al. .................... 305/24 |
| 1,318,188 | 10/1919 | Tritton . |
| 2,704,942 | 3/1955 | Koile . |
| 2,791,256 | 5/1957 | Sinclair . |
| 2,838,344 | 6/1958 | Eyb . |
| 2,984,524 * | 5/1961 | Franzen ................... 305/194 |
| 2,989,351 | 6/1961 | Deysher et al. . |
| 3,309,150 * | 3/1967 | Marier ...................... 305/136 |
| 3,540,743 | 11/1970 | Ashton et al. .............. 277/92 |
| 3,567,292 | 3/1971 | Amsden . |
| 3,606,497 | 9/1971 | Gilles . |
| 3,703,936 * | 11/1972 | Padwick et al. ........... 305/130 |
| 3,840,082 * | 10/1974 | Olson ...................... 305/124 |
| 4,349,234 * | 9/1982 | Hartmann ................. 305/194 |
| 4,425,008 | 1/1984 | Weeks ..................... 305/24 |
| 4,538,860 | 9/1985 | Edwards et al. ........... 305/56 |
| 4,950,030 | 8/1990 | Kindel et al. ............. 305/24 |
| 4,998,783 | 3/1991 | Erlenmaier et al. ........ 305/56 |
| 5,022,718 | 6/1991 | Diekevers ................. 305/24 |
| 5,141,299 | 8/1992 | Korpi ....................... 305/56 |
| 5,433,515 | 7/1995 | Purcell et al. ............. 305/25 |
| 5,447,635 * | 9/1995 | Muramatsu et al. ....... 305/193 |
| 5,484,321 * | 1/1996 | Ishimoto .................. 305/195 |
| 5,944,134 * | 8/1999 | Peppel et al. ............. 180/9.5 |
| 6,086,169 * | 7/2000 | Keehner ................... 305/137 |

OTHER PUBLICATIONS

U.S. application No. 08/992,353, filed Jan. 17, 1997 Self Propelled Implement.
U.S. application No. 09/196,044, filed Nov. 19, 1998 Mid-wheel Assembly for a Track–Type Tractor.
U.S. application No. 09/238,957, filed Jan. 27, 1999 Heat Shielded Mid–Roller.

\* cited by examiner

*Primary Examiner*—S. Joseph Morano
*Assistant Examiner*—Jason R. Bellinger
(74) *Attorney, Agent, or Firm*—Jeffrey A. Greene

(57) ABSTRACT

Endless track laying work machines are provided with a pair of track laying assemblies positioned on opposite sides of the work machine. Each track laying assembly includes an endless rubber belt entrained around a drive wheel, an idler wheel, and a plurality of mid-rollers. The present mid-roller includes a rotatable member that is positioned between individual roller segments and the guide blocks that are positioned on the inner surface of the endless rubber belt. With the rotatable member in this position, the differential angular velocity between points of contact between the rubber belt and the mid-rollers is compensated for by rotating the rotatable member independent of the individual roller segments. Thus, increasing the life of the individual drive components.

16 Claims, 3 Drawing Sheets

MID-ROLLER FOR ENDLESS TRACK LAYING WORK MACHINE

TECHNICAL FIELD

This invention relates generally to a mid-roller for an endless track laying work machine and more particularly to a mid-roller having an independently rotatable member positioned between the guide blocks of an endless track and an inner shoulder of the mid-roller.

BACKGROUND ART

Present day endless track laying work machines utilize a propulsion system in which an endless rubber belt is frictionally driven as it is entrained about a pair of wheels. Problems encountered in actually reducing such an endless track laying work machine to practice include how to maintain adequate tension on such belt, and keeping the belt in lateral alignment with the wheels when the wheels are subject to large lateral loads. Other problems are maintaining the structural integrity and providing long life for the belt, mid-rollers, drive wheels, and idler wheels.

A common problem with endless track laying work machines utilizing endless rubber belts is wear of drive train components. Wear is caused by the continuous contact and heat generated between the endless rubber belts and other drive components, such as the drive wheel, the idler wheel, and the mid-rollers. This is most prevalent with the mid-rollers because of the speed at which they rotate in contrast to the drive and idler wheels, due to the mid-rollers generally being smaller in diameter.

Examples of prior solutions are shown in U.S. Pat. Nos. 2,984,524 and 5,141,299. In both examples a wear strep is provided on the inner shoulders of a segmented wheel. These wear strips provide a surface for the guiding members of the endless track to make contact as the track moves between segments of the wheel. Both patents provide a fix for increasing the life of the drive train components. However, neither patent addresses the difference in angular velocity between the contact points of the segmented wheel and the endless track as the endless track makes contact with the wheels.

The present invention is directed to overcome one or more of the problems as set forth above.

DISCLOSURE OF THE INVENTION

In one aspect of the invention a mid-roller is provided comprising a shaft defining an axis, the shaft has a pair of ends spaced along the axis and a cylindrical surface is centered on the shaft. Individual roller segments are rotatably attached near each of the ends and are separated by the cylindrical surface of the shaft. A pair of rotatable members are positioned inward from the individual roller segments. The pair of rotatable members are independently rotatable of the pair of roller segments.

In another aspect of the present invention a method is provided for reducing frictional contact between an endless rubber belt and a plurality of mid-rollers of an endless track laying machine. The endless rubber belt has an inner surface, an outer surface and a plurality of guide blocks. The method comprises the steps of positioning a rotatable member between the plurality of guide blocks and an inner shoulder of each of the individual roller segments of the mid-rollers, shielding the plurality of guide blocks from the individual roller segments of the mid-rollers as the endless rubber belt moves between the individual roller segments, rotating the rotatable member independent of the rotation of the individual roller segments.

BEST MODE FOR CARRYING OUT THE INVENTION

Figure 1:
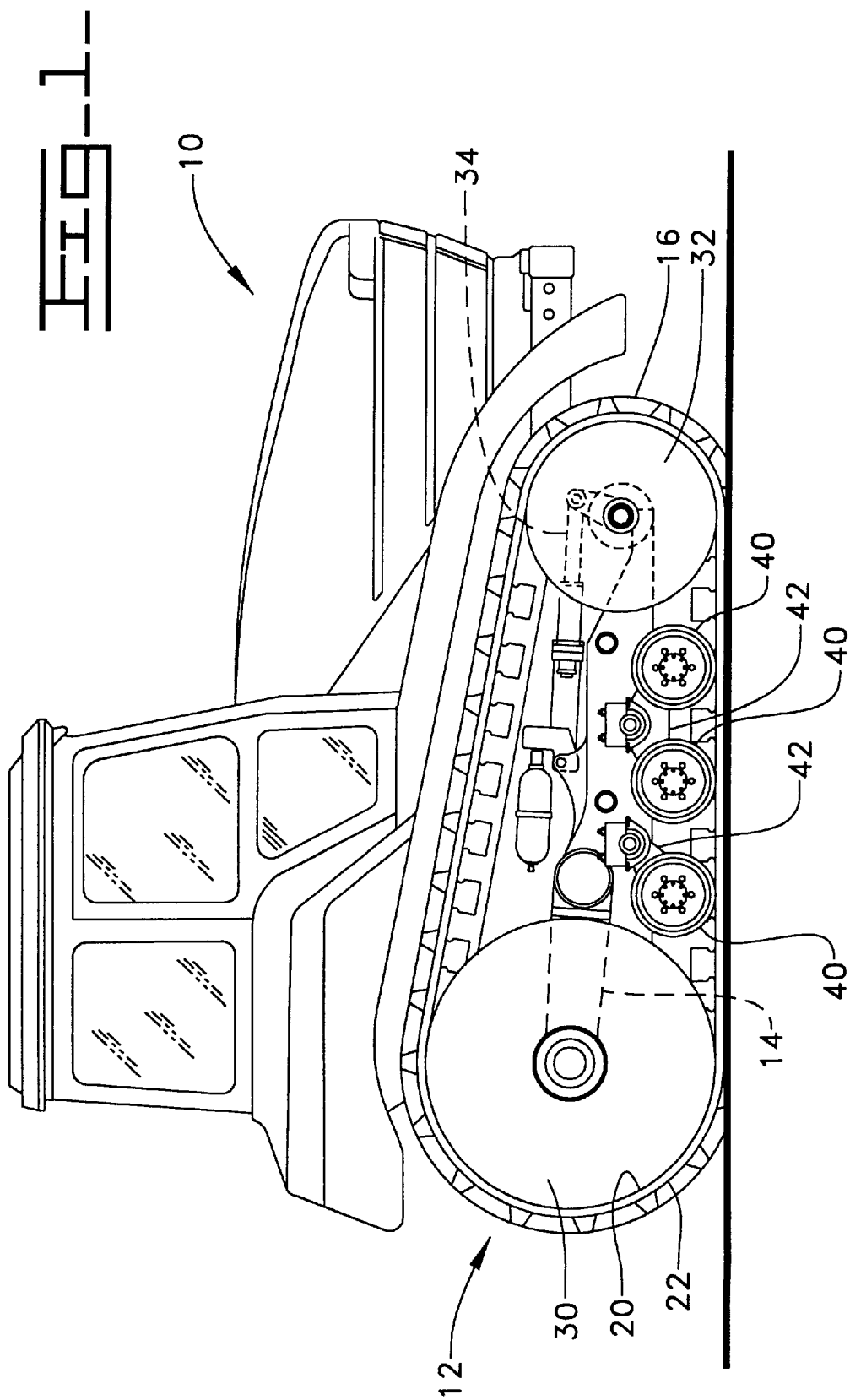
FIG. 1 is a side elevational view of a work machine embodying the present invention.
Figure 2:
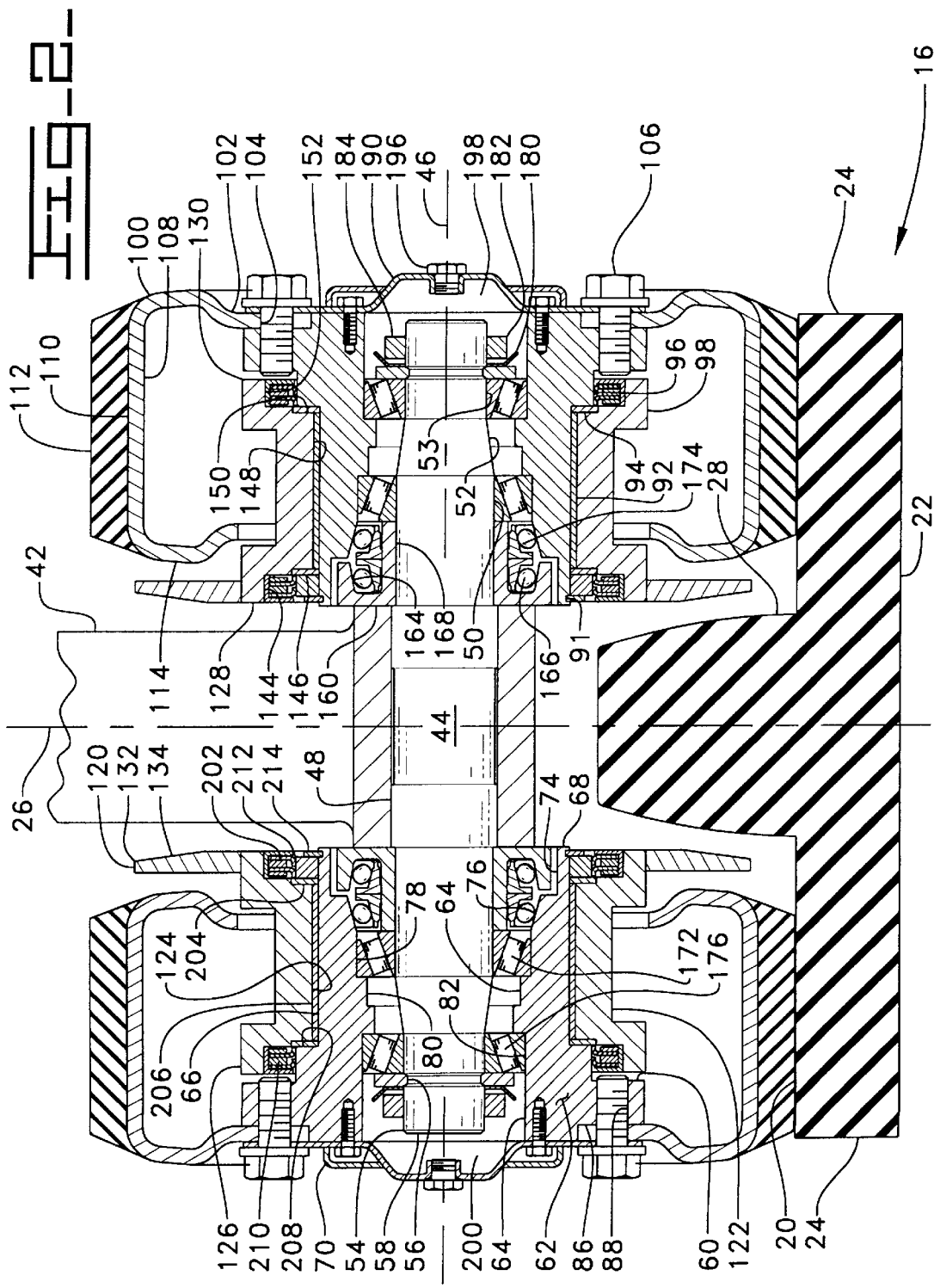
FIG. 2 is an enlarged sectional view of an embodiment of a mid-roller embodying the present invention.

Referring to FIGS. 1 and 2, an endless track laying work machine 10 is shown having a pair of track roller assemblies 12, only one shown, one positioned on each side of the endless track laying work machine 10. Each track roller assembly 12 includes a roller frame 14 and utilizes an endless rubber belt 16. The endless rubber belt 16 defines an inner surface 20, a ground contacting or outer surface 22, and a pair of edges 24. Positioned on the inner surface 22 and centrally located on an elevational axis 26 between the pair of edges 24 is a plurality of guide blocks 28. Each endless rubber belt 16 is entrained around a drive wheel 30 and an idler wheel 32. In as much as the track roller assemblies 12 are substantially structurally and operatively similar, further reference will be made to only a single side of the endless track laying work machine 10.

In this example, an engine (not shown) powers the drive wheel 30, in a conventional manner, and frictionally drives each of the endless rubber belts 16. Urging the idler wheel 32 away from the drive wheel 30, through the use of a tensioning system 34, tensions the endless rubber belt 16. The endless track laying work machine 10 is for example, an agricultural tractor positioning the drive wheel 30 near the back and the idler wheel 32 toward the front of the endless track laying work machine 10.

As further shown in FIGS. 1 interposed the drive wheel 30 and the idler wheel 32 is a plurality of mid-rollers 40. The mid-rollers 40 are attached to a suspension member 42, such as a bogie frame or trailing arm that is attached to the roller frame 14. As an alternative, the mid-rollers 40 could be directly attached to the roller frame 14.

Referring to FIG. 2, each mid-roller 40 includes a shaft 44 defining an axis 46 and having a generally stepped configuration defining a first cylindrical surface 48 having a major diameter and a pre-established length is generally centered on the shaft 44 between a pair of ends 49. A pair of second cylindrical surfaces 50 axially extends from the first cylindrical surface 48 towards each of the pair of ends 49 and has a pre-established length with a diameter being less than that of the major diameter. A pair of third cylindrical surfaces 53 are positioned between a respective one on the pair of ends 49 and the pair of second cylindrical surfaces 50. A pair of transition portions 52 are interposed the second cylindrical surfaces 50 and the pair of third cylindrical surfaces 53. A threaded portion 54 extends axially outward from the pair of third cylindrical surfaces 51 towards the pair of ends 49. An undercut 56 is positioned at each of the pair of ends 49 and is interposed the third cylindrical surface 53 and the threaded portion 54.

In a first embodiment, as further shown in FIG. 2, assembled about the shaft 44 is a pair of hubs 60. Each hub 60 includes a cylindrical housing 62 spaced from the axis 46 a predetermined distance and defines an inner surface 64 and an outer surface 66. The cylindrical housing 62 defines a first end 68 positioned inwardly of the respective one of the pair of ends 49 of the shaft 44 and a second end 70 positioned outwardly of the same respective one of the pair of ends 49. Spaced inwardly from the second end 70 and projecting radially outward from the axis 46 is a flange portion 86 having a plurality of threaded holes 88 positioned therein.

The inner cylindrical surface 64 extends axially between the first end 68 and a second end 70. The inner cylindrical surface 64 includes several machined surfaces. For example, progressing from the first end 68 to the second end 70 is a counterbore 74, a sealing portion 76, a first bearing portion 78, a stepped spacer portion 80 and a second bearing portion 82.

The outer surface 66 extends axially between the first end 68 and the second end 70. The outer surface 66 also includes several machined surfaces. For example, progressing from the first end 68 to the second end 70 is a groove 91, a bearing surface 92, a shoulder portion 94, a sealing surface 96, and an outer cylindrical surface 98.

In further reference to FIG. 2, positioned at the second end 70 of each cylindrical housing 62 is an individual roller segment 100. Each roller segment 100 has a radial face 102 having a plurality of clearance holes 104 corresponding to the plurality of threaded holes 86 positioned in the flange portion 86 of the cylindrical housing 62. A plurality of threaded fasteners 106 connect the respective individual roller segment 100 to the pair of hubs 60. An outer cylindrical housing 108, is symmetrical with the axis 46, extends axially inwards towards axis 26 from the radial face 102 of the individual segment 100. The outer cylindrical housing 108 has an outer peripheral surface 110 having a predetermined axial length and being spaced from the axis 46 a predetermined distance. An elastomeric material 112, for example rubber, is bonded to the outer peripheral surface 110. Projecting inward, towards axis 46, from the outer cylindrical housing 108 is an inner shoulder 114 being spaced from axis 26 a predetermined distance. It should be recognized that the individual segment 100 could be manufactured as an integral part of each individual hub 60.

Still referring to FIG. 2, assembled about the cylindrical housings 62 of the pair of hubs 60 is a pair of rotatable members 120. Each rotatable member 120 includes a cylindrical housing 122 spaced from the axis 46 a predetermined distance and defines an inner surface 124 and an outer surface 126. The cylindrical housing 122 further defines a first end 128 positioned radially outward from the first end 68 of the pair of hubs 60 and a second end 130 spaced inwardly from the flange portion 86. Projecting radially outward from the first end 128 is a flange portion 132 that defines a radial surface 134.

The inner surface 124 is interposed the first end 128 and the second end 130 and includes several machined surfaces. For example, progressing from the first end 128 to the second end 130 is a first sealing portion 144, a first bearing shoulder 146, a cylindrical bearing surface 148, a second bearing shoulder 150 and a second sealing portion 152.

Continuing with FIG. 2, a pair of seal housings 160 are positioned in abutting relationship with the suspension member 42. Each of the pair of seal housings 160 has a generally "J" configuration. The base of each of the pair of seal housings 160 is made up partially by a short leg 164 that extends axially parallel to the second cylindrical surfaces 50 a pre-established distance at a predetermined diameter from the axis 46 of the shaft 44. The short leg 164 is of sufficient length so as to house a first sealing member 166 therein, which is for example a portion of a dual cone seal. A long leg 168 extends axially along the pair of second cylindrical surfaces 50 a pre-established distance being greater in length than that of the short leg 164 and is spaced from the short leg 164 a pre-established distance. A pair of inner bearings 172 is positioned about the second cylindrical surfaces 50 of the shaft 44 and in abutment with the pair of seal housings 160.

The pair of inner bearings 172 is also positioned in the first bearing portion 78 of the inner cylindrical surface 64 of the cylindrical housing 62, and positioned in abutment with the stepped spacer portion 80. A second sealing member 174, being another portion of a dual cone seal is in sealing contact with the first sealing member 166, is positioned in the sealing portion 76 of the inner cylindrical surface 64 of the cylindrical housing 62.

Positioned in the second bearing portion 82 of the inner cylindrical surface 64 of the cylindrical housing 62 is a pair of outer bearings 176 that are also in abutment with the stepped spacer portion 80. The pair of outer bearings 176 are also positioned about the shaft 44 on the second cylindrical surfaces 50. A pair of washers 180 are positioned about the shaft 44 in abutment with the pair of outer bearings 176. The pair of washers 180 are also in abutting relationship with a respective one of a pair of locks 182 and a pair of nuts 184. Each nut 184 is threadably connected to the threaded portion 56 of the shaft 44. The nut 184 abuttingly positions the lock 182, the washer 180, the pair of outer bearings 176, the pair of inner bearings 172, and the seal housings 160 into engagement with the suspension member 42. Additionally, the first seal members 166 and the second seal members 174 are positioned in sealing relationship. The relationship between the above components, the shaft 44 and the cylindrical housing 62 at each of the pair of ends 49 of the shaft 44 is symmetrical about axis 26.

Positioned at the second end 70 of the cylindrical housing 62 is a cap 190. The cap 190 is sealingly connected to the cylindrical housing 62 in a conventional manner such as by fasteners. A conventional plug 196 is positioned in each of the caps 190.

Each of the pair of hubs 60, the first and second seal members 166,174, the seal housings 160, the shaft 44, the cap 190 and the plug 196 have a cavity 198 formed therebetween in which a lubricant 200, such as oil is stored.

An inner seal 202 is positioned in the first sealing portion 144 near the first end 128 of the cylindrical housing 122. A first thrust washer 204 is positioned about the bearing surface 92 of the outer cylindrical surface 66 and in abutment with the first bearing surface 146. A sleeve bearing 206 is positioned about the cylindrical bearing surface 92 and within the cylindrical bearing surface 148 of the pair of rotatable members 120. A second thrust washer 208 is positioned about the bearing surface 92 of the outer cylindrical surface 66 and in abutment with the second bearing shoulder 150 and the shoulder portion 94. An outer seal 210 is positioned within the second sealing portion 152 near the second end 130 of the cylindrical housing 122. Positioned within the inner seal 202 is a ring member 212. Ring member is also positioned about the bearing surface 92 in abutting relationship to the first thrust washer 204. A snap ring 214 holds the ring member 212, the first thrust washer 204, the bearing shoulder 146, the sleeve bearing 206, the second thrust washer 208, the second bearing shoulder 150 and the shoulder portion 94 in an abutting relationship.

Figure 3:
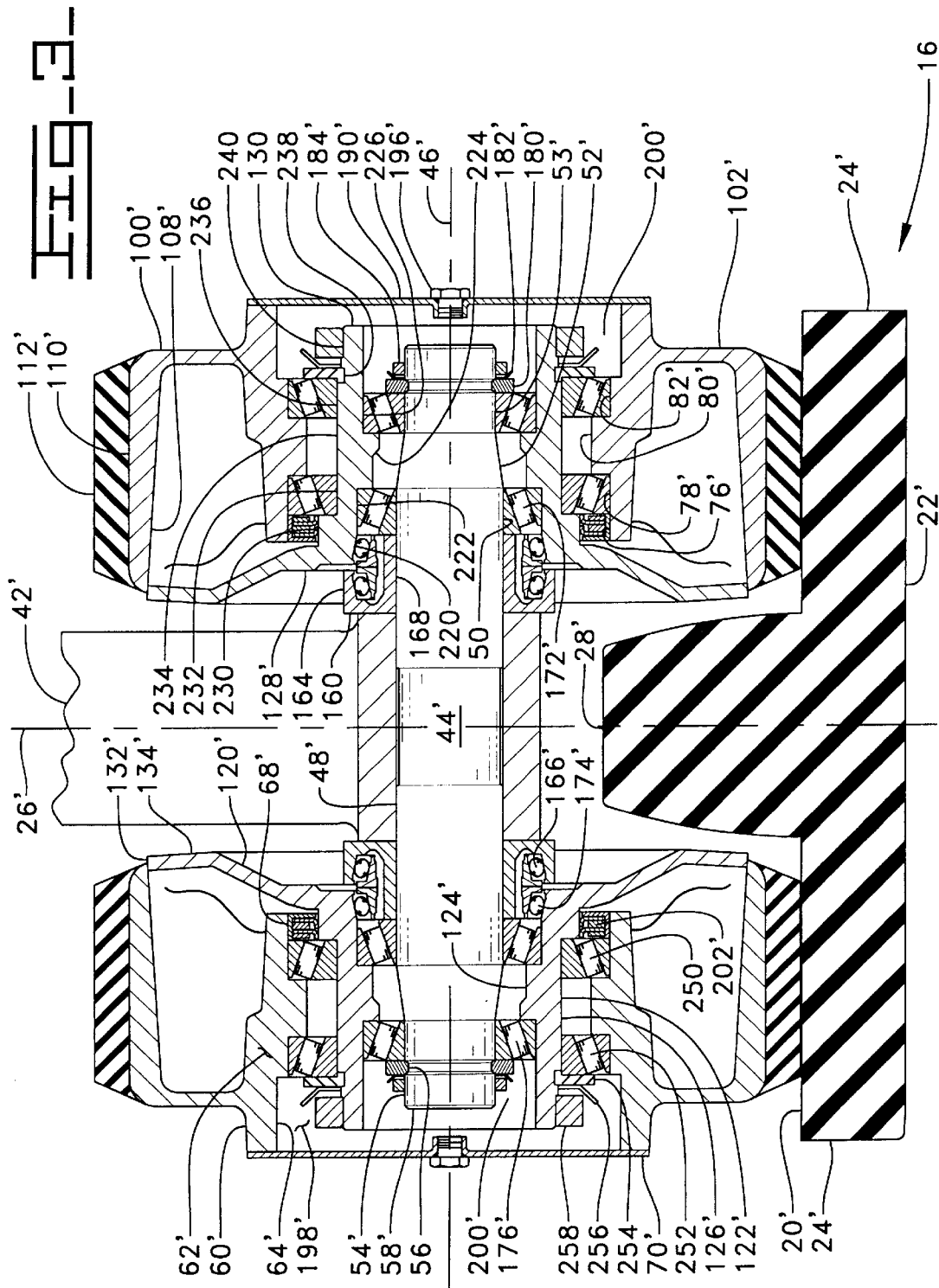
FIG. 3 is an enlarged sectional view of an alternate embodiment of a mid-roller embodying of the present invention.

A second embodiment is shown in FIG. 3 with similar elements having a prime designation as those shown in FIG.

2. Assembled about the shaft 44' is a pair of rotatable members 120'. Each rotatable member 120' includes a cylindrical housing 122' spaced from the axis 46' a predetermined distance and defines an inner surface 124' and an outer surface 126'. The cylindrical housing 122' defines a first end 128' positioned inwardly of the respective one of the pair of ends 49' of the shaft 44' and a second end 130' positioned outwardly of the respective pair of ends 49'. Projecting radially outward from the first end 128' is a flange portion 132' that defines a radial surface 134'.

The inner surface 124' is interposed the first end 128' and the second end 130' and includes several machined surfaces. For example, progressing from the first end 128' to the second end 130' is a sealing portion 220, a first bearing portion 222, a stepped spacer portion 224 and a second bearing portion 226.

The outer surface 126' is interposed the flange portion 132' and the second end 130' and includes several machined surfaces. For example, progressing from the flange portion 132' to the second end 130' is a sealing portion 230, a first bearing portion 232, a spacer portion 234, a second bearing portion 236, an undercut 238, and a threaded outer portion 240.

Still referring to FIG. 3, assembled about the cylindrical housing 122' of the pair of rotatable members 120' is a pair of hubs 60' being symmetrical with the axis 46' of the shaft 44'. Each pair of hubs 60' includes a cylindrical housing 62' spaced from the axis 46' a predetermined distance and defines an inner surface 64' and an outer surface 66'. The cylindrical housing 62' further defines a first end 68' positioned inwardly from the first end 128' of the pair of rotatable members 120' and a second end 70' spaced outwardly from the second end 130' of the rotatable members 120'.

The inner surface 64' is interposed the first end 68' and the second end 70' and includes several machined surfaces. For example, progressing from the first end 68' to the second end 70' is a sealing portion 76', a first bearing portion 78', a spacer portion 80', and a second bearing portion 82'. Spaced inwardly from the second end 70' of each of the pair of hubs 60' is a roller segment 100'.

Each roller segment 100' has a radial face 102' being integral with the pair of hubs 60'. An outer cylindrical housing 108', being symmetrical with the axis 46', extends axially inwards towards axis 26' from the radial face 102' of the individual segments 100'. The outer cylindrical housing 108' has an outer peripheral surface 110' having a predetermined length and being spaced from the axis 46' a predetermined distance. An elastomeric material 112', for example rubber, is bonded to the outer peripheral surface 110'. It should be recognized that the individual roller segments 100' could be manufactured as described in the first embodiment to be fastened to each individual hub 60'.

Positioned at the second end 70' of the cylindrical housing 62' is a cap 190'. The cap 190' is sealingly connected to the cylindrical housing 62' in a conventional manner as by fasteners. A conventional plug 196' is positioned in each of the caps 190'.

Continuing with FIG. 3, a pair of seal housings 160' are each positioned in abutting relationship with the suspension member 42'. Each of the pair of seal housings 160' has a generally "J" configuration. The base of each of the pair of seal housings 160' is made up partially by a short leg 164' that extends axially parallel to the second cylindrical surfaces 50' a pre-established distance at a predetermined diameter from the shaft 44'. The short leg 164' is of sufficient length so as to house a first sealing member 166' therein, which is for example one half of a dual cone seal. A long leg 168' extends axially along the pair of second cylindrical surfaces 50' a pre-established distance being greater in length than that of the short leg 164' and is spaced from the short leg 164' a pre-established distance. A pair of inner bearings 172' are positioned about the second cylindrical surfaces 50' of the shaft 44', and in abutment with the corresponding bearing end 170' of the pair of seal housings 160'.

The pair of inner bearings 172' are also positioned in the first bearing portion 222 of the inner surface 124' of the cylindrical housing 122', and positioned in abutment with the stepped spacer portion 224. A second sealing member 174', being another portion of a dual cone seal is in sealing contact with the first sealing member 166', is positioned in the sealing portion 220 of the inner surface 124' of the cylindrical housing 122'.

Positioned in the second bearing portion 226 of the inner surface 124' of the cylindrical housing 122' is a pair of outer bearings 176' that are also in abutment with the stepped spacer portion 224. The pair of outer bearings 176' are also positioned about the shaft 44' on the second cylindrical surfaces 50'. A pair of washers 180' are positioned about the shaft 44' in abutment with the pair of outer bearings 176'. The pair of washers 180' are also in abutting relationship with a respective one of a pair of locks 182' and a pair of nuts 184'. Each of the pair of nuts 184' is threadably connected to the threaded portion 56' of the shaft 44'. The nut 184' abuttingly positions the lock 182', the washer 180', the pair of outer bearings 176', the pair of inner bearings 172', and the seal housings 160' into engagement with the suspension member 42'. Additionally, the first seal members 166' and the second seal members 174' are positioned in sealing relationship. The relationship between the above components, the shaft 44' and the cylindrical housing 122' at each end 49' of the shaft 44' is symmetrical about axis 26'.

A pair of inner bearings 250 is positioned about the first bearing surface 232 of the cylindrical housing 122', and in abutment with the sealing portion 230. The pair of inner bearings 172 is also positioned in the first bearing portion 78' of the inner cylindrical surface 64' of the cylindrical housing 62', and positioned in abutment with the spacer portion 80'. An inner seal 202' is positioned in the sealing portion 76' of the inner surface 64' of the cylindrical housing 62'.

Positioned in the second bearing portion 82' of the inner cylindrical surface 64' of the cylindrical housing 62' is a pair of outer bearings 252 that are in abutment with the spacer portion 80'. The pair of outer bearings 252 is also positioned about the second bearing portion 236. A pair of washers 254 is positioned about the threaded outer portion 240 in abutment with the pair of outer bearings 252. The pair of washers 254 is also in abutting relationship with a lock 256 and a nut 258. The nut 258 is threadably connected to the threaded outer portion 240 of the outer surface 126' of the rotatable member 120'. The nut 258 abuttingly positions the lock 256, the washer 254, the pair of outer bearings 252, and the pair of inner bearings 250 into engagement with the sealing portion 230 of the rotatable member 120'.

Positioned at the second end 70' of the cylindrical housing 62' is a cap 190'. The cap 190' is sealingly connected to the cylindrical housing 62' in a conventional manner as by fasteners. A conventional plug 196' is positioned in each of the caps 190'.

Each of the pair of hubs 60', the inner seal 202', the first and second seal members 166',174', the seal housings 160', the shaft 44', the cap 190' and the plug 196' have a cavity 198' formed therebetween in which a lubricant 200', such as oil is stored.

While the invention is susceptible to various modifications and alternative forms specific embodiments for the mid-rollers 40 have been shown by way of example in the drawings and have been described in detail. It should be understood, however, that there is no intent to limit the invention to the particular form disclosed, but on the contrary, the intention is to cover all modifications, equivalents, and alternatives falling within the spirit and scope of the invention as defined by the appended claims.

INDUSTRIAL APPLICABILITY

As, the endless track laying work machine 10 travels across different terrain it encounters irregularities such as furrows, hills and side slopes. Different loads are imputed into the endless rubber belts 16 as they rotate around the drive wheel 30, the idler wheel 32, and the mid-rollers 40. As the endless track laying work machine 10 traverses different terrain the endless rubber belt 16 tends to shift from side to side, causing the plurality of guide blocks 28 to make contact with the drive wheel 30, the idler wheel 32 and the mid-rollers 40. For example, while the endless track laying work machine 10 is in operation the guide blocks 28 make contact with the radial surface 134 of the mid-rollers 40. The guide blocks 28 contact the mid-roller 40 closer to the axis 46 of rotation of the mid-rollers 40 than the inner surface 20 of the rubber belt 16 contacts the outer peripheral surface 110 of the mid-roller 40. This creates a difference in the relative velocity between the two points of contact. As this contact occurs the rotatable member 120 rotates independently of the individual roller segments 100. Therefore the difference between the rotational velocity of the point of contact between the guide blocks 28 and the mid-roller 40 and the inner surface 20 of the rubber belt 16 and the mid-roller 40 is compensated for. Also, the rotatable member 120 receives any lateral forces that the mid-roller 40 would normally encounter. This reduces wear on the mid-rollers 40 and the rubber belt 16, and also reduces the possibility of heat generation.

Thus, the rotatable members 120 effectively and efficiently reduce wear caused by the rotational and lateral contact between the rubber belt 16 and the mid-rollers 40. Furthermore, the rotatable members 120 increases the life of the mid-rollers 40 and other associated drive train components, such as the endless rubber belts 16, the drive wheels 30 and the idler wheels 32.

What is claimed is:

1. A mid-roller (40) comprising:
    a shaft (44) defining an axis (46), a pair of ends (49) being spaced along said axis (46) and a cylindrical surface (48) being axially centered on said shaft (44);
    a pair of individual roller segments (100) being rotatably attached near each of the ends (49) and being separated by said cylindrical surface (48) of said shaft (44); and
    a pair of rotatable members (120) being positioned inward from and coaxial with said individual roller segments (100), said pair of rotatable members (120) being independently rotatable of the individual roller segments (100).

2. The mid-roller (40) of claim 1 wherein each of said pair of individual roller segments (100) are individually rotatable about said shaft (44).

3. The mid-roller (40) of claim 1 wherein said roller segment (100) is attached to a hub (60), said hub (60) being rotatably attached at each of said ends (49) of said shaft (44).

4. The mid-roller (40) of claim 3 wherein said pair of rotatable members (120) further include a cylindrical housing (122) having an inner surface (124) and an outer surface (126).

5. The mid-roller (40) of claim 4 wherein said cylindrical housing (122) of said rotatable member (120) is positioned about an outer surface (66) of said hub (60).

6. The mid-roller (40) of claim 4 wherein said cylindrical housing (122) of said rotatable member (120) is rotatably attached at each of said ends (49) of said shaft (44) and said hub (60) is rotatably attached to said outer surface (124) of said cylindrical housing (122) of said rotatable member (120).

7. The mid-roller (40) of claim 1 wherein said roller segment (100) is attached to a hub (60), said hub (60) being rotatably attached at each of said ends (49) of said shaft (44), said hub (60) defining a cavity (198) containing a lubricant (200).

8. The mid-roller (40) of claim 7 further comprising wherein said lubricant (200) is replaceable.

9. An endless track laying work machine (10) having a pair of track roller assemblies (12), each track roller assembly (12) having a track roller frame (14) and an endless belt (16) defining an inner surface (20), an outer surface (22) and a plurality of guide blocks (28), said endless belt (16) being driven by a drive wheel (30) and an idler wheel (32), said endless belt (16) being tensioned between said drive wheel (30) and said idler wheel (32) by a tensioning system (34), said endless track laying work machine (10) comprising:
    a plurality of mid-rollers (40) connected to the track roller frame (14) and rotatably contacting the inner surface (20) of the endless belt (16);
    said plurality of mid-rollers (40) including a shaft (44) defining an axis (46), said shaft (44) having a pair of ends (49) being spaced along said axis (46);
    said plurality of mid-rollers (40) including a pair of individual roller segments (100), one each being fixedly attached to said ends (49) of said shaft (44); and
    a pair of rotatable members (120) being attached to said ends (49) of said shaft (44), said pair of rotatable members (120) being coaxial with and independently rotatable of the pair of individual roller segments (100), one of said rotatable members (120) being positioned between each individual roller segment (100) and the plurality of guide blocks (28).

10. The endless track laying work machine (10) of claim 9 wherein said pair of individual roller segments (100) straddle the roller frame (14).

11. The endless track laying work machine (10) of claim 9 wherein said individual roller segments (100) are attached to a hub (60), said hub (60) being rotatably attached at each of said ends (49) of said shaft (44).

12. The endless track laying work machine (10) of claim 11 wherein said pair of rotatable members (120) each further include a cylindrical housing (122) having an inner surface (124) and an outer surface (124).

13. The endless track laying work machine (10) of claim 12 wherein said cylindrical housing (122) of said pair of rotatable members (120) is positioned about an outer surface (66) of said hub (60).

14. The endless track laying work machine (10) of claim 13 wherein said cylindrical housing of said rotatable member (120) is rotatably attached at each of said ends (49) of said shaft (49) and said hub (60) is rotatably attached to said outer surface (126) of said cylindrical housing (122) of said rotatable member (120).

15. The endless track laying work machine (10) of claim 9 wherein said plurality of mid-rollers (40) includes a pair of hubs (60) defining a cavity (198) in which a lubricant (200) is positioned.

16. A method for reducing frictional contact between an endless rubber belt (16) and a mid-roller (40) of an endless track laying machine (10), said endless rubber belt (16) having an inner surface (20), an outer surface (22) and a plurality of guide blocks (28), comprising the steps of:

positioning a rotatable member coaxially between the plurality of guide blocks (28) and an inner shoulder (114) of each of a respective one of an individual roller segment (100) of the mid-roller (40);

shielding the inner shoulder (114) of the individual roller segments (100) from the plurality of guide blocks (28) of the endless rubber track (16); and rotating the rotatable member (120) as the plurality of guide blocks (28) make contact with the rotatable member (120) independent from the rotation of the individual roller segments (100).

\* \* \* \* \*